United States Patent
Do et al.

(10) Patent No.: US 12,476,242 B2
(45) Date of Patent: *Nov. 18, 2025

(54) LITHIUM SECONDARY BATTERY

(71) Applicant: SK ON CO., LTD., Seoul (KR)

(72) Inventors: Young Hoon Do, Daejeon (KR); Yoon Ji Lee, Daejeon (KR); Yong Hyun Cho, Daejeon (KR); In Haeng Cho, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/479,926

(22) Filed: Oct. 3, 2023

(65) Prior Publication Data

US 2024/0072298 A1  Feb. 29, 2024

Related U.S. Application Data (62) Division of application No. 17/003,635, filed on Aug. 26, 2020, now Pat. No. 11,811,019.

(30) Foreign Application Priority Data

Aug. 28, 2019  (KR) ........................ 10-2019-0105944

(51) Int. Cl.
*H01M 4/131* (2010.01)
*H01M 4/36* (2006.01)
(Continued)

(52) U.S. Cl.
CPC ........... *H01M 4/131* (2013.01); *H01M 4/364* (2013.01); *H01M 4/366* (2013.01); *H01M 4/505* (2013.01);
(Continued)

(58) Field of Classification Search
CPC ...... H01M 4/131; H01M 4/525; H01M 4/364; H01M 2004/028; H01M 2004/021;
(Continued)

(56) References Cited

U.S. PATENT DOCUMENTS 10,886,568 B2 *  1/2021  Lee ................... H01M 10/0567
10,916,806 B2 *  2/2021  Shatunov .......... H01M 10/0567
(Continued)

FOREIGN PATENT DOCUMENTS

JP  2018181543 A  11/2018
KR  20130138147 A  12/2013
KR  20190014622 A  2/2019

OTHER PUBLICATIONS

Notice of Allowance for the Korean Patent Application 10-2019-0105944 issued by the Korean Patent Office on Sep. 25, 2023.

*Primary Examiner* — Laura Weiner
(74) *Attorney, Agent, or Firm* — IP & T GROUP LLP (57) ABSTRACT

Provided is a lithium secondary battery, and the lithium secondary battery of the present invention includes: a positive electrode including a first lithium-metal oxide including secondary particles formed by aggregating primary particles having a particle diameter of 2 μm or less and a second lithium-metal oxide including nickel and at least one or more metals selected from the group consisting of manganese (Mn) and cobalt (Co) and including particles having a primary particle diameter of 2 μm or more; a negative electrode; a separator interposed between the positive electrode and the negative electrode; and an electrolyte, wherein the electrolyte includes a lithium salt, a nonaqueous organic solvent, and a difluorophosphite compound containing at least one or more difluorophosphite groups.

11 Claims, 1 Drawing Sheet

(51) Int. Cl.
  *H01M 4/505*   (2010.01)
  *H01M 4/525*   (2010.01)
  *H01M 10/0525*  (2010.01)
  *H01M 10/0567*  (2010.01)
  *H01M 10/0569*  (2010.01)
  *H01M 4/02*    (2006.01)
  *H01M 50/46*   (2021.01)

(52) U.S. Cl.
  CPC ....... *H01M 4/525* (2013.01); *H01M 10/0525* (2013.01); *H01M 10/0567* (2013.01); *H01M 10/0569* (2013.01); *H01M 2004/028* (2013.01); *H01M 50/46* (2021.01); *H01M 2300/0025* (2013.01); *H01M 2300/0034* (2013.01)

(58) Field of Classification Search
  CPC ......... H01M 10/0525; H01M 10/0567; H01M 10/0569; H01M 2300/0034; H01M 2300/0025; H01M 4/505
  See application file for complete search history.

(56) References Cited

U.S. PATENT DOCUMENTS

| | | | |
|---|---|---|---|
| 11,335,953 B2* | 5/2022 | Cho | H01M 10/0567 |
| 2004/0058244 A1* | 3/2004 | Hosoya | H01M 4/525 |
| | | | 429/223 |
| 2019/0252724 A1* | 8/2019 | Shatunov | H01M 10/0567 |
| 2019/0326636 A1* | 10/2019 | Lee | H01M 10/0567 |
| 2019/0379086 A1* | 12/2019 | Yoo | H01M 4/525 |

* cited by examiner

LITHIUM SECONDARY BATTERY

CROSS-REFERENCE TO RELATED APPLICATIONS

This application is a divisional application of U.S. Patent Application Ser. No. 17/003,635 filed on Aug. 26, 2020, and issued as U.S. Pat. No. 11,811,019 on Nov. 7, 2023, which claims priority under 35 U.S.C. § 119 to Korean Patent Application No. KR 2019-0105944, filed on Aug. 28, 2019, in the Korean Intellectual Property Office, the disclosure of which is incorporated herein by reference in its entirety.

TECHNICAL FIELD

The following disclosure relates to a lithium secondary battery, and more particularly, to a lithium secondary battery adopting a positive electrode manufactured with a positive electrode active material including a mixture of lithium-metal oxides having different two structures and an electrolyte including a difluorophosphite compound as an additive.

BACKGROUND

In recent years, as an industrial environment changes in the direction of pursuing eco-friendly energy, a study of a new energy source has been intensively conducted. In particular, a study of a lithium secondary battery which has a high energy density, exhibits high performance, and also allows stable electric power supply as a main power source or an auxiliary power source of an electric vehicle or a hybrid vehicle, has been actively conducted.

Therefore, in order to improve an energy density of a lithium secondary battery, a high-voltage lithium secondary battery charged with a voltage of 4.2 V or more has been developed, a lithium-containing cobalt oxide ($LiCoO_2$) is mainly used as a positive electrode active material of the lithium secondary battery, and additionally, a lithium-containing manganese oxide such as $LiMnO_2$ having a layered crystal structure and $LiMn_2O_4$ having a spinel crystal structure, and a lithium-containing nickel oxide ($LiNiO_2$) are also used.

A $LiNiO_2$-based positive electrode active material shows a rapid phase transition of a crystal structure depending on a volume change accompanied by a charge-discharge cycle, and when the $LiNiO_2$-based positive electrode active material is exposed to air and moisture, chemical resistance on the surface thereof is rapidly decreased, and an excessive amount of gas is produced during storage and cycles, and thus, due to these problems, commercialization thereof is currently limited.

Thus, a lithium transition metal oxide in which nickel is partially substituted by other transition metals such as manganese and cobalt has been suggested. The metal-substituted nickel-based lithium transition metal oxide has an advantage of better cycle characteristics and capacity characteristics at room temperature, but in this case also, the cycle characteristics are rapidly deteriorated in long-term use at a high temperature, and the problems such as swelling by gassing in the battery and low chemical stability are not sufficiently solved. In particular, a lithium nickel-based transition metal oxide having a high content of nickel produces an excessive amount of gas during storage or a cycle, so that a serious battery swelling phenomenon is shown and high-temperature stability is low.

Accordingly, development of a battery material which can solve the problems of a high-capacity long-life lithium secondary battery at a high temperature is needed.

RELATED ART DOCUMENTS

Patent Documents (Patent Document 1) US 2015-0364798

SUMMARY

An embodiment of the present invention is directed to providing a lithium secondary battery having surprisingly improved high rate charge/discharge characteristics, output characteristics, high-temperature characteristics, and high-temperature storage stability.

In one general aspect, a lithium secondary battery includes: a positive electrode including a first lithium-metal oxide including secondary particles formed by aggregating primary particles having a particle diameter of 2 μm or less and a second lithium-metal oxide including nickel and at least one or more metals selected from the group consisting of manganese (Mn) and cobalt (Co) and including particles having a primary particle diameter of 2 μm or more; a negative electrode; a separator interposed between the positive electrode and the negative electrode; and an electrolyte, wherein the electrolyte includes a lithium salt, a nonaqueous organic solvent, and a difluorophosphite compound containing at least one or more difluorophosphite groups.

Preferably, the first lithium-metal oxide according to an exemplary embodiment of the present invention may include the secondary particles formed by aggregating the primary particles having a particle diameter of 2 μm or less, and may have a core-shell structure including a core part and a shell part in which one or more metals other than lithium has a concentration gradient region in the shell part.

In addition, the shell part of the first lithium-metal oxide according to an exemplary embodiment of the present invention refers to a region having a concentration gradient, and in the present invention, may be within a range of 2 μm from an active material surface to an active material center side.

Preferably, the difluorophosphite compound according to an exemplary embodiment of the present invention may be a difluorophosphite compound represented by the following Chemical Formula 1 or a difluorophosphite olefin compound including at least one difluorophosphite group and at least one or more olefin groups:

[Chemical Formula 1]

wherein A is substituted or unsubstituted C1-C10 alkyl or C3-C10 cycloalkyl.

Preferably, the first lithium-metal oxide according to an exemplary embodiment of the present invention is represented by the following Chemical Formula 11, and in Chemical Formula 11, at least one of M1, M2, and M3 may have a concentration gradient region in the shell part:

[Chemical Formula 11]

wherein M1, M2, and M3 are independently of one another selected from the group consisting of Ni, Co, Mn, Na, Mg, Ca, Ti, V, Cr, Cu, Zn, Ge, Sr, Ag, Ba, Zr, Nb, Mo, Al, Ga, and B; and $0<x\le1.1$, $2\le y\le2.02$, $0\le a\le1$, $0\le b\le1$, $0\le c\le1$, and $0<a+b+c\le1$ are satisfied.

In the lithium secondary battery according to an exemplary embodiment of the present invention, the second lithium-metal oxide may be a second lithium-metal oxide represented by the following Chemical Formula 12, and the difluorophosphite compound may include a compound in which in Chemical Formula 1, A is C2-C8 alkyl, C2-C8 alkyl substituted with cyano, C2-C8 alkyl or C3-C7 cycloalkyl substituted with H—(CH$_2$CH$_2$O)$_m$— wherein m is an integer of 1 or 2:

[Chemical Formula 12]

wherein

M4 includes one or more elements selected from the group consisting of Ti, Zr, Al, Mg, and Cr;

M5 includes any one or two or more elements selected from the group consisting of Sr, Y, W, and Mo; and $0<x<1.5$, $2\leq y\leq 2.02$, $0\leq a\leq 1$, $0\leq b\leq 1$, $0\leq c\leq 1$, $0\leq d\leq 0.03$, $0\leq e\leq 0.030$, and $0<a+b+c\leq 1$ are satisfied.

Preferably, in Chemical Formula 11 according to an exemplary embodiment of the present invention, M1 may be Ni, and $0.6\leq a\leq 0.95$ and $0.05\leq b+c\leq 0.4$ may be satisfied, and in Chemical Formula 12, x, d, and e may be 0 and $0.5\leq a\leq 1$, $0.01\leq b\leq 0.3$ and $0.01\leq c\leq 0.3$ may be satisfied.

Preferably, a content of the first lithium-metal oxide according to an exemplary embodiment of the present invention may be higher than a content of the second lithium-metal oxide.

Preferably, Chemical Formula 1 according to an exemplary embodiment of the present invention may be represented by the following Chemical Formula 2 or Chemical Formula 3:

[Chemical Formula 2]

wherein

R is hydrogen, cyano, or H—(CH$_2$CH$_2$O)$_m$—; and n is an integer of 2 to 8 and m is an integer of 1 or 2,

[Chemical Formula 3]

Wherein p is an integer of 1 to 3.

Preferably, the difluorophosphite olefin compound according to an exemplary embodiment of the present invention may be represented by the following Chemical Formula 4 or Chemical Formula 5:

[Chemical Formula 4]

wherein $R_1$ to $R_3$ are independently of one another hydrogen, *—(CH$_2$)$_r$—OPF$_2$, C1-C10 alkyl, or C2-C10 alkenyl; L is C1-C10 alkylene, and the alkylene of L may be further substituted by one or more selected from the group consisting of C1-C10 alkyl, *—(CH$_2$)$_a$—OPF$_2$, and R' is hydrogen or —OPF$_2$;

a and b are independently of each other an integer of 0 to 5;

q is an integer of 0 to 5; and r is an integer of 0 to 5,

[Chemical Formula 5]

wherein ring D is mono-, bi-, or tri-C6-C20 cycloalkenyl.

Preferably, the difluorophosphite compound according to an exemplary embodiment of the present invention may be any one or more selected from the following compounds:

-continued

Preferably, the difluorophosphite compound according to an exemplary embodiment of the present invention may be included at 0.1 to 5 wt %, based on a total weight of the electrolyte.

Preferably, the electrolyte according to an exemplary embodiment of the present invention may further include one or two or more additional additives selected from the group consisting of oxalatoborate-based compounds, oxalatophosphate-based additives, carbonate-based compounds substituted with fluorine, vinylidene carbonate-based compounds, and sulfinyl group-containing compounds, and the additional additive may be included at 0.1 to 10.0 wt %, based on the total weight of the electrolyte.

Other features and aspects will be apparent from the following detailed description, the drawings, and the claims.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a," "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, the present invention will be described in detail. Technical terms and scientific terms used in the present specification have the general meaning understood by those skilled in the art to which the present invention pertains unless otherwise defined, and a description for the known function and configuration obscuring the present invention will be omitted in the following description.

Regarding "substituted", "having a substituent", and substituents described in the present invention, unless otherwise stated, as the optionally substituted substituent of the present invention, a halogen, hydroxyl, a carboxylic acid group, nitro, cyano, (lower) alkyl, haloalkyl, mono- or di-alkylamino, alkoxy, thioalkyl, cycloalkyl, heterocycloalkyl, aryl, heteroaryl, —NO2, —NRa1Rb1, —NRa1C(=O) Rb1, —NRa1C(=O)NRa1Rb1, —NRa1C(=O)ORb1, —NRa1SO2Rb1, —ORa1, —CN, —C(=O)Ra1, —C(=O)ORa1, —C(=O)NRa1Rb1, —OC(=O)Ra1, —OC(=O)ORa1, —OC(=O)NRa1Rb1, —NRa1SO2Rb1, —PO3Ra1, —PO(ORa1) (ORb1), —SO2Ra1, —S(O)Ra1, —SO(NRa1)Rb1 (for example, sulfoximine), —S(NRa1)Rb1 (for example, sulfilimine), and —SRa1 may be used, in which Ra1 and Rb1 may be the same or different, and independently of each other hydrogen, a halogen, amino, alkyl, alkoxyalkyl, haloalkyl, aryl, or heterocycle, or Ra1 and Rb1 may be in the form of a heterocycle with a nitrogen atom attached thereto. Here, the number of Ra1 and Rb1 may be plural depending on the atom attached thereto, preferably alkyl may be C1-C6 alkyl, cycloalkyl and heterocycloalkyl may be C3-C12 cycloalkyl and heterocycloalkyl, aryl may be C6-C12 aryl, and heterocycle and heteroaryl may be C3-C12 heterocycle and heteroaryl.

"Alkyl" described in the present invention refers to an aliphatic hydrocarbon group having 1 to 10 carbon atoms, preferably 1 to 8 carbon atoms, and more preferably 1 to 6 carbon atoms. The alkyl may be linear or branched alkyl, respectively, in the case of being used alone or in combination. The linear or branched alkyl may include specifically, methyl, ethyl, normal propyl, isopropyl, normal butyl, isobutyl, tert-butyl, normal pentyl, neo-pentyl, normal hexyl, isohexyl, normal heptyl, normal octyl, normal nonyl, normal decyl, and the like.

"Alkoxy" described in the present invention refers to a radical represented by the chemical formula —ORa, wherein Ra is alkyl having the number of carbon atoms as defined above. Examples of the alkoxy group include —O—methyl (methoxy), —O-ethyl (ethoxy), —O-propyl (propoxy), —O-isopropyl (isopropoxy), and the like, without limitation.

"Alkenyl" described in the present invention refers to a saturated linear or branched acyclic hydrocarbon containing 2 to 10, preferably 2 to 6 carbon atoms and at least one carbon-carbon double bond. Representative linear or branched (C2-C10) alkenyl includes -vinyl, -allyl, -1-butenyl, -2-butenyl, -isobutylenyl, -1-pentenyl, -2-pentenyl, -3-methyl-1-butenyl, -2-methyl-2-butenyl, -2,3-dimethyl-2-butenyl, -1-hexenyl, -2-hexenyl, -3-hexenyl, -1-heptenyl, -2-heptenyl, -3-heptenyl, -1-octenyl, -2-octenyl, -3-octenyl, -1-nonenyl, -2-nonenyl, -3-nonenyl, -1-dicenyl, -2-dicenyl, and -3-dicenyl. The alkenyl group may be selectively substituted.

"Metal" described in the present invention may include metals, transition metals, and non-metals.

"Discharge" described in the present invention means a process in which lithium ions are desorbed from a negative electrode, and "charge" means a process in which lithium ions are inserted into a negative electrode.

The present invention provides a lithium secondary battery having excellent high-temperature storage characteristics and high-temperature life characteristics, and the lithium secondary battery of the present invention includes: a positive electrode including a first lithium-metal oxide including secondary particles formed by aggregating primary particles having a particle diameter of 2 μm or less and a second lithium-metal oxide including nickel and at least one or more metals selected from the group consisting of manganese (Mn) and cobalt (Co) and including particles having a primary particle diameter of 2 μm or more; a negative electrode; a separator interposed between the positive electrode and the negative electrode; and an electrolyte, wherein the electrolyte includes a lithium salt, a nonaqueous organic solvent, and a difluorophosphite compound containing at least one or more difluorophosphite groups.

Preferably, the lithium secondary battery according to an exemplary embodiment of the present invention may have a structure in which the first lithium-metal oxide includes the secondary particles formed by aggregating the primary particles having a particle diameter of 2 μm or less, but the metal has no concentration gradient.

Preferably, in the lithium secondary battery according to an exemplary embodiment of the present invention, the first lithium-metal oxide may include the secondary particles formed by aggregating the primary particles having a particle diameter of 2 μm or less, simultaneously may have a core-shell structure including a core part and a shell part in which one or more metals other than lithium has a concentration gradient region in the shell part.

Preferably, the lithium secondary battery according to an exemplary embodiment of the present invention adopts a positive electrode including the first lithium-metal oxide including the secondary particles formed by aggregating the primary particles having a particle diameter of 2 μm or less and the second lithium-metal oxide including at least one or more metals selected from the group consisting of manganese (Mn) and cobalt (Co) and nickel and including particles having a primary particle diameter of 2 μm or more and the electrolyte including the difluorophosphite compound, thereby having excellent high-temperature characteristics and storage stability.

Preferably, the difluorophosphite compound according to an exemplary embodiment of the present invention may be a difluorophosphite compound represented by the following Chemical formula 1 or a difluorophosphite olefin compound including at least one difluorophosphite group and at least one or more olefin groups:

$$A\text{-}OPF_2 \qquad \text{[Chemical Formula 1]}$$

wherein A is substituted or unsubstituted C1-C10 alkyl or C3-C10 cycloalkyl.

While a lithium secondary battery is charged and discharged, a positive electrode active material structurally collapses, so that metal ions are eluted from a positive electrode surface. The eluted metal ions are electrodeposited on a negative electrode to deteriorate the negative electrode. This deterioration phenomenon tends to be further accelerated when a potential of a positive electrode is increased or a battery is exposed to a high temperature. Besides, the lithium secondary battery has a problem that when a driving voltage is increased, coat decomposition on the positive electrode surface occurs, and the positive electrode surface is exposed to an electrolyte and undergoes a side reaction with the electrolyte.

In particular, since an electric vehicle is required to have a battery with a very high energy density, a high-content Ni NCM which is generally used as a positive electrode material when a high-energy density battery is operated is vulnerable in terms of structure and thermal stability.

Furthermore, the side reaction is increased due to particle cracks occurring in electrode pressing during manufacture of an electrode, the battery becomes very vulnerable to high-temperature stability.

In order to solve the problems, the lithium secondary battery of the present invention adopts the difluorophosphite compound of Chemical Formula 1 in an electrolyte and simultaneously uses a positive electrode adopting a positive electrode active material prepared by two lithium-metal oxides having different structural characteristics, thereby having improved battery characteristics.

Specifically, in the lithium secondary battery of the present invention, the difluorophosphite compound of Chemical Formula 1 is coordinated to a transition metal of the positive electrode to further stabilize a positive electrode structure to prevent a battery swelling phenomenon due to gassing during high-temperature storage, thereby significantly lowering a gassing rate at a high temperature and preventing deterioration of room temperature life characteristics even in operation under high voltage.

That is, the difluorophosphite compound of Chemical Formula 1, more specifically, a difluorophosphite compound having only one or more —$OPF_2$ substituents is included in the electrolyte for a lithium secondary battery of the present invention, whereby the lithium secondary battery has improved thermal stability to have a significantly lowered thickness increase rate of a battery at a high temperature to have excellent high-temperature storage characteristics, and has lowered battery resistance to prevent deterioration of life characteristics at room temperature.

At the same time, the positive electrode of the lithium secondary battery of the present invention is manufactured with a positive electrode active material including a first lithium-metal oxide including secondary particles formed by aggregating primary particles having a particle diameter of 2 μm or less and a second lithium-metal oxide having a primary particle diameter of 2 μm or more, thereby improving thermal stability of the positive electrode, and thus, the lithium secondary battery of the present invention has excellent high-temperature characteristics.

Preferably, the first lithium-metal oxide of the present invention includes secondary particles formed by aggregating primary particles having a particle diameter of 2 μm or less, and may have a core-shell structure including a core part and a shell part and have a nickel concentration gradient in which a nickel content is decreased toward a first lithium-metal oxide surface in the shell part.

The shell part of the first lithium-metal oxide according to an exemplary embodiment of the present invention may have a thickness range within 2 μm, preferably a thickness range of 0.1 to 2 μm from the first lithium-metal oxide surface to the core part which is in a center side.

That is to say, the difluorophosphite compound of the present invention lowers resistance of the battery under a high voltage to prevent deterioration of life characteristics and simultaneously, and is coordinated to the transition metal of the positive electrode to further stabilize a positive electrode structure to minimize a thickness increase rate and a gassing rate at a high temperature, thereby improving high-temperature characteristics. That is, the difluorophosphite compound of Chemical Formula 1 of the present invention is coordinated to the transition metal of the positive electrode to further stabilize the positive electrode structure to improve the high-temperature characteristics of the lithium battery at a high temperature under a high voltage, and also, a positive electrode manufactured by including the lithium-metal oxides having different specific structures in the positive electrode active material is adopted to alleviate a life deterioration phenomenon due to particle breakage of the positive electrode and further to prevent deterioration of the negative electrode.

The first lithium-metal oxide according to an exemplary embodiment of the present invention may have a nickel content of 60% or more, preferably 80% or more in all metals.

In addition, the first lithium-metal oxide according to an exemplary embodiment of the present invention may include particles having a particle diameter of 10 μm or more and preferably particles having a particle diameter of 12 μm to 16 μm, and the second lithium-metal oxide may include particles having a particle diameter of 2 μm or more, preferably primary particles having a particle diameter of 3 μm or more, more preferably primary particles having a particle diameter of 3 μm to 8 μm, and more preferably primary particles having a particle diameter of 3 μm to 6 μm.

Preferably, the first lithium-metal oxide according to an exemplary embodiment is represented by the following Chemical Formula 11, in which at least one of M1, M2, and M3 may have a concentration gradient region in the shell part:

$$Li_x(M1)_a(M2)_b(M3)_cO_y$$ [Chemical Formula 11]

wherein

M1, M2, and M3 are independently of one another selected from the group consisting of Ni, Co, Mn, Na, Mg, Ca, Ti, V, Cr, Cu, Zn, Ge, Sr, Ag, Ba, Zr, Nb, Mo, Al, Ga, and B; and $0<x\leq1.1$, $2\leq y\leq2.02$, $0\leq a\leq1$, $0\leq b\leq1$, $0\leq c\leq1$, and $0<a+b+c\leq1$ are satisfied.

Preferably, in the lithium secondary battery of the present invention, the second lithium-metal oxide may be a second lithium-metal oxide represented by the following Chemical Formula 12, and the difluorophosphite compound may be the compound of Chemical Formula 1, in which A is C2-C8 alkyl, C2-C8 alkyl substituted with cyano, C2-C8 alkyl or C3-C7 cycloalkyl substituted with $H-(CH_2CH_2O)_m-$ wherein m is an integer of 1 or 2:

$$Li_xNi_aCo_bMn_c(M4)_d(M5)_eO_y$$ [Chemical Formula 12]

wherein

M4 includes one or more elements selected from the group consisting of Ti, Zr, Al, Mg, and Cr;

M5 includes any one or two or more elements selected from the group consisting of Sr, Y, W, and Mo; and $0<x<1.5$, $2\leq y\leq2.02$, $0\leq a\leq1$, $0\leq b\leq1$, $0\leq c\leq1$, $0\leq d\leq0.03$, $0\leq e\leq0.030$, and $0<a+b+c\leq1$ are satisfied.

In terms of chemical stability and electrical characteristics, preferably, the lithium secondary battery according to an exemplary embodiment of the present invention may include a positive electrode manufactured with an active material including the compounds of Chemical Formulae 11 and 12, and in Chemical Formula 1, A may be C1-C10 alkyl or C3-C10 cycloalkyl unsubstituted or substituted with one or more selected from the group consisting of cyano, C1-C10 alkoxy, and C1-C10 alkoxy C1-C10 alkoxy, and more preferably, A may be C2-C8 alkyl, C2-C8 alkyl substituted with cyano, C2-C8 alkyl substituted with $H-(CH_2CH_2O)_m-$, or C3-C7 cycloalkyl, wherein m may be an integer of 1 or 2.

In Chemical Formula 11 according to an exemplary embodiment of the present invention, M1 may be Ni, and $0.6\leq a\leq0.95$ and $0.05\leq b+c\leq0.4$ may be satisfied, and more preferably $0.7\leq a\leq0.9$ and $0.1\leq b+c\leq0.3$ may be satisfied.

Preferably, the first lithium-metal oxide may have a concentration gradient region in which a nickel content is decreased and a manganese content is increased from the shell part to the first lithium-metal oxide surface side.

In Chemical Formula 12 according to an exemplary embodiment of the present invention, d and e may be 0, and $0.5\leq a\leq1$, $0.01\leq b\leq0.3$, $0.01\leq c\leq0.3$, and $0<a+b+c\leq1$ may be satisfied, and preferably Chemical Formula 12 may be $Li_{1.0}Ni_{0.8}Co_{0.1}Mn_{0.1}O_2$.

A preferred combination of the electrolyte and the positive electrode according to an exemplary embodiment of the present invention may be a combination of an electrolyte including the difluorophosphite compound with $Li_{1.0}Ni_{0.8}Co_{0.1}Mn_{0.1}O_2$ having a core-shell structure including a core part and a shell part in which one or more metals other than lithium has a concentration gradient region in the shell part, as the first lithium-metal oxide and $Li_{1.0}Ni_{0.8}Co_{0.1}Mn_{0.1}O_2$ as the second lithium-metal oxide.

A mixing weight ratio of the first lithium-metal oxide and the second lithium-metal oxide according to an exemplary embodiment of the present invention may be 6 to 9:1 to 4, preferably 7 to 9:3 to 1, more preferably 8 to 9:2 to 1, and more preferably 8:2.

Preferably, the difluorophosphite compound of Chemical Formula 1 according to an exemplary embodiment of the present invention may be a difluorophosphite compound represented by the following Chemical Formula 2 or Chemical Formula 3:

[Chemical Formula 2]

wherein

R is hydrogen, cyano, or $H-(CH_2CH_2O)_m-$; and n is an integer of 2 to 8 and m is an integer of 1 or

[Chemical Formula 3]

wherein p is an integer of 1 to 3.

More preferably, in Chemical Formula 3, p may be an integer of 1 or 2.

More preferably, in Chemical Formula 2, R may be hydrogen, and n may be an integer of 3 to 8, preferably 5 to 8.

More preferably, in Chemical Formula 2, R may be cyano or H—$(CH_2CH_2O)_m$—, n may be an integer of 2 to 8, preferably 2 to 5, and m may be an integer of 1 or 2.

The difluorophosphite compound according to an exemplary embodiment of the present invention compound may be one or more selected from the following structures, but is not limited thereto:

The difluorophosphite compound according to an exemplary embodiment of the present invention may be a difluorophosphite olefin compound including at least one difluorophosphite group and at least one or more olefin groups.

In the electrolyte according to an exemplary embodiment of the present invention, the difluorophosphite olefin compound may be represented by the following Chemical Formula 4 or 5:

[Chemical Formula 4]

wherein

R$_1$ to R$_3$ are independently of one another hydrogen, *—$(CH_2)_r$—OPF$_2$, C1-C10 alkyl, or C2-C10 alkenyl;

L is C1-C10 alkylene, and the alkylene of L may be further substituted by one or more selected from the group consisting of C1-C10 alkyl, *—$(CH_2)_a$—OPF$_2$, and R' is hydrogen or —OPF$_2$;

a and b are independently of each other an integer of 0 to 5;

q is an integer of 0 to 5; and r is an integer of 0 to 5,

[Chemical Formula 5]

wherein ring D is mono-, bi-, or tri-C6-C20 cycloalkenyl.

In Chemical Formula 4, R$_1$ and R$_2$ may be independently of each other hydrogen, —$(CH_2)_n$—OPF$_2$, C1-C7 alkyl, or C2-C7 alkenyl, n may be an integer of 1 to 3, and R$_3$ may be hydrogen or —OPF$_2$.

The difluorophosphite olefin compound may include 1 to 6 difluorophosphite groups and 1 to 6 olefin groups, preferably 1 to 4 difluorophosphite groups and 1 to 4 olefin groups, more preferably 1 to 3 difluorophosphite groups and 1 or 2 olefin groups, and still more preferably 1 or 2 difluorophosphite groups and 1 or 2 olefin groups.

In the lithium secondary battery according to an exemplary embodiment of the present invention, preferably, the difluorophosphite olefin compound may be a difluorophosphite olefin compound represented by the following Chemical Formula 6 or Chemical Formula 7, in terms of chemical stability and electrical properties:

[Chemical Formula 6]

wherein

R$_1$ to R$_3$ are as defined in Chemical Formula 1;

L$_1$ is C$_1$-C$_3$ alkylene;

L$_2$ is a single bond or C1-C3 alkylene;

R$_{11}$ and R$_{12}$ are independently of each other hydrogen, C1-C7 alkyl, *—$(CH_2)_c$—OPF$_2$, or R" is hydrogen or —OPF$_2$; and c and d are independently of each other an integer of 1 to 3,

[Chemical Formula 7]

wherein

R$_1$ to R$_3$ are as defined in Chemical Formula 1;

L$_3$ and L$_4$ are independently of each other a single bond or C1-C3 alkylene;

$R_{13}$ and $R_{14}$ are independently of each other hydrogen, C1-C7 alkyl, *—$(CH_2)_e$—$OPF_2$, or

R''' is hydrogen or —$OPF_2$; and e and f are independently of each other an integer of 0 to 3.

In the electrolyte according to an exemplary embodiment of the present invention, in Chemical Formula 6, $R_1$ and $R_2$ may be independently of each other hydrogen or C1-C4 alkyl, and $R_3$ may be hydrogen.

In the electrolyte for a according to an exemplary embodiment of the present invention, in Chemical Formula 7, $R_1$ and $R_2$ may be independently of each other hydrogen, —$(CH_2)_n$—$OPF_2$, or C2-C4 alkenyl, $R_3$ may be hydrogen or —$OPF_2$, and n may be an integer of 1 to 3.

In the lithium secondary battery according to an exemplary embodiment of the present invention, more preferably, the difluorophosphite olefin compound may be a difluorophosphite olefin compound represented by the following Chemical Formula 8, in terms of high-temperature storage characteristics:

[Chemical Formula 8]

wherein $L_2$ is a single bond or C1-C3 alkylene;

$R_{11}$ is hydrogen or C1-C7 alkyl;

$R_{12}$ is hydrogen, *—$(CH_2)_c$—$OPF_2$, or and c and d are independently of each other an integer of 1 to 3.

In the electrolyte for a lithium secondary battery according to an exemplary embodiment of the present invention, still more preferably, the difluorophosphite olefin compound may be a difluorophosphite olefin compound represented by the following Chemical Formula 9, in terms of high-temperature storage characteristics:

[Chemical Formula 9]

wherein

$R_{12}$ is hydrogen, *—$(CH_2)_c$—$OPF_2$, or and c and d are independently of each other an integer of 1 to 3.

In the electrolyte according to an exemplary embodiment of the present invention, more preferably, the difluorophosphite olefin compound may be a difluorophosphite olefin compound represented by the following Chemical Formula 10, in terms of high-temperature storage characteristics:

[Chemical Formula 10]

wherein $R_{11}$ is C1-C4 alkyl;

$R_{12}$ is $(CH_2)_c$—$OPF_2$ or and c and d are independently of each other an integer of 1 to 3.

More specifically, the difluorophosphite olefin compound may be one or more selected from the following structures, but is not limited thereto:

In the lithium secondary battery according to an exemplary embodiment of the present invention, the difluorophosphite compound may be included at 0.1 to 5 wt % in terms of improving high-temperature stability and preventing deterioration of the characteristics of the lithium secondary battery due to rapid life deterioration occurrence and the like, more preferably at 0.5 to 3 wt in terms of high-temperature stability, and still more preferably at 0.5 to 2 wt %, based on the total weight of the electrolyte for a secondary battery.

In the lithium secondary battery according to an exemplary embodiment of the present invention, the electrolyte may further include one or two or more additives selected from the group consisting of an oxalatoborate-based compound, an oxalatophosphate-based additive, a fluorine-substituted carbonate-based compound, a vinylidene carbonate-based compound, and a sulfinyl group-containing compound, as a specific additional additive for improving high-temperature storage stability.

The oxalatoborate-based compound, the oxalatophosphate-based additive, the fluorine-substituted carbonate-based compound, the vinylidene carbonate-based compound, and the sulfinyl group-containing compound according to an exemplary embodiment of the present invention are described in Korean Patent Application No. 2018-0155136, and are all included in the present invention.

In an exemplary embodiment of the present invention, more preferably, the electrolyte may further include two or more additives selected from fluorine-substituted carbonate-based compounds, vinylidene carbonate-based compounds, sultone-based compounds, oxalatophosphate-based compounds, and sulfate-based compounds, and more preferably, the electrolyte may further include two or more additives selected from the group consisting of fluorine-substituted carbonate-based compounds, vinylidene carbonate-based compounds, oxalatophosphate-based compounds, sultone-based compounds of Chemical Formula F, and cyclic sulfate-based compounds of Chemical Formula G, in terms of high-temperature stability. Still more preferably, the electrolyte may include all of the fluorine-substituted carbonate-based compounds, the vinylidene carbonate-based compounds, the oxalatophosphate-based compounds, the sultone-based compounds of Chemical Formula F, and the cyclic sulfate-based compounds of Chemical Formula G as the additive, in terms of more improved high-temperature characteristics of the lithium secondary battery.

Specifically, the electrolyte may further include two or more additives selected from fluoroethylene carbonate, difluoroethylene carbonate, fluorodimethyl carbonate, fluoroethylmethyl carbonate, vinylene carbonate, vinylethylene carbonate, lithium bis(oxalato)borate (LiBOB), lithium difluorobis(oxalato)phosphate (LiDFBOP), ethanesultone, 1,3-propanesultone, 1,4-butanesultone, ethenesultone, 1,3-propenesultone, 3-fluoro-1,3-propanesultone, 1,4-butenesultone, ethylene sulfate, propylene sulfate, 2,3-butylene sulfate, 1,3-propylene sulfate, and 1,3-butylene sulfate.

More preferably, the electrolyte according to an exemplary embodiment of the present invention may further include fluoroethylene carbonate, vinylene carbonate, 1,3-propanesultone, 1,3-propenesultone, lithium difluorobis(oxalato)phosphate (LiPF$_2$(C$_2$O$_4$)$_2$, LiDFBOP), ethylene sulfate, or a mixture of thereof, as an additional additive, and it is more preferred that the electrolyte solution includes a mixture of fluoroethylene carbonate, vinylene carbonate, 1,3-propanesultone, 1,3-propenesultone, lithium difluorobis(oxalato)phosphate (LiPF$_2$(C$_2$O$_4$)$_2$, LiDFBOP), and ethylene sulfate, in terms of more improved high-temperature characteristics of the lithium secondary battery including the electrolyte.

In the electrolyte according to an exemplary embodiment of the present invention, the content of the additional additive is not largely limited, but in order to improve high-temperature characteristics such as high-temperature stability, high-temperature storage, and a high-temperature life within the electrolyte for a secondary battery, the additive may be included at 0.1 to 10.0 wt %, more preferably 0.1 to 5.0 wt %, and still more preferably 0.5 to 2.0 wt %, based on the total weight of the electrolyte.

In the electrolyte according to an exemplary embodiment of the present invention, the nonaqueous organic solvent may include carbonate, ester, ether, or ketone alone or in combination, and it is preferred that the nonaqueous organic solvent is selected from cyclic carbonate-based solvents, linear carbonate-based solvents, and mixed solvents thereof, and it is most preferred that a mixture of a cyclic carbonate-based solvent and a linear carbonate-based solvent is used. The cyclic carbonate-based solvent has a high polarity, so that it may sufficiently dissociate lithium ions, but has a low ion conductivity due to its high viscosity. Therefore, the cyclic carbonate-based solvent may be mixed with a linear carbonate-based solvent having low polarity but low viscosity, thereby optimizing the characteristics of the lithium secondary battery.

The cyclic carbonate-based solvent may be selected from the group consisting of ethylene carbonate, propylene carbonate, butylene carbonate, vinylene carbonate, vinylethylene carbonate, fluoroethylene carbonate, and a mixture thereof, and the linear carbonate may be selected from the group consisting of dimethyl carbonate, diethyl carbonate, dipropyl carbonate, ethylmethyl carbonate, methylpropyl carbonate, methylisopropyl carbonate, ethylpropyl carbonate, and a mixture thereof.

In the electrolyte according to an exemplary embodiment of the present invention, the non-aqueous organic solvent which is a mixed solvent of a cyclic carbonate-based solvent and a linear carbonate-based solvent may be used with a mixed volume ratio between the linear carbonate-based solvent to the cyclic carbonate-based solvent of 1 to 9:1, preferably 1.5 to 4:1.

In the electrolyte according to an exemplary embodiment of the present invention, the lithium salt is not limited, but may be one or two or more selected from the group consisting of $LiPF_6$, $LiBF_4$, $LiClO_4$, $LiSbF_6$, $LiAsF_6$, $LiN(SO_2C_2F_5)_2$, $LiN(CF_3SO_2)_2$, $LiN(SO_3C_2F_5)_2$, $LiN(SO_2F)_2$, $LiCF_3SO_3$, $LiC_4F_9SO_3$, $LiC_6H_5SO_3$, LiSCN, $LiAlO_2$, $LiAlCl_4$, $LiN(C_xF_{2x+1}SO_2)(C_yF_{2y+1}SO_2)$ (wherein x and y are independently of each other a natural number), LiCl, LiI, and $LiB(C_2O_4)_2$.

A concentration of the lithium salt is preferably within a range of 0.1 to 2.0 M, more preferably within a range of 0.7 to 1.6 M. When the concentration of the lithium salt is less than 0.1 M, the conductivity of the electrolyte is lowered, so that the performance of the electrolyte is deteriorated, and when the concentration of the lithium salt is more than 2.0 M, the viscosity of the electrolyte is increased, so that the mobility of lithium ions is decreased. The lithium salt serves as a source of lithium ions in the battery, thereby allowing operation of a basic lithium secondary battery.

The electrolyte according to an exemplary embodiment of the present invention is stable at a temperature range of −20 to 60° C., preferably 10 to 60° C., maintains electrochemically stable characteristics even under a high voltage in a range of 4.20 V or higher, specifically 4.30 V or higher, and more specifically 4.35 V or higher based on a positive electrode potential, and thus, may be applied to all lithium secondary batteries such as a lithium ion battery and a lithium polymer battery.

Non-limiting examples of the secondary battery according to an exemplary embodiment of the present invention include a lithium metal secondary battery, a lithium ion secondary battery, a lithium polymer secondary battery, a lithium ion polymer secondary battery, and the like.

The lithium secondary battery manufactured from the electrolyte according to an exemplary embodiment of the present invention has high output as well as low thickness increase rate and gassing rate of the battery, when allowed to stand at a high temperature for a long period of time.

The lithium secondary battery of the present invention includes a positive electrode including a positive electrode active material including two lithium-metal oxides having a specific structure, specifically a nickel-cobalt-manganese-based positive electrode active material, a negative electrode, a separator interposed between the positive electrode and the negative electrode, and an electrolyte for a secondary battery including the difluorophosphite compound.

Specifically, the positive electrode according to an exemplary embodiment of the present invention includes a positive electrode active material which may adsorb and desorb lithium ions.

The positive electrode active material according to an exemplary embodiment of the present invention may include a first lithium-metal oxide which is a nickel-cobalt-manganese-based active material, specifically the nickel-cobalt-manganese-based active material having a core-shell structure including a core part and a shell part in which one or more metals other than lithium has a concentration gradient region in the shell part, and a second lithium-metal oxide, as a preferred combination with the electrolyte for a lithium secondary battery according to an exemplary embodiment of the present invention.

The difluorophosphite compound included in the electrolyte according to an exemplary embodiment of the present invention is coordinated to a transition metal (specifically, nickel, manganese, or cobalt) of the positive electrode including a combination of two lithium-metal oxides having different structures to further stabilize a positive electrode structure, thereby suppressing a side reaction of a positive electrode surface with the electrolyte during high-temperature storage to prevent decomposition of the electrolyte and preventing gassing to effectively suppressing a swelling phenomenon in which a battery is swollen, and thus, the difluorophosphite compound may improve the high-temperature storage stability of the lithium secondary battery.

In addition, the lithium secondary battery adopting a combination of the specific positive electrode and the electrolyte including a specific additive of the present invention may have improved cycle life characteristics and stability even at a high temperature and under a high voltage.

That is, according to an exemplary embodiment of the present invention, the electrolyte including the difluorophosphite compound and the positive electrode manufactured with the positive electrode active material including the first lithium-metal oxide having a core-shell structure in which one or more metals other than lithium has a concentration gradient region in the shell part and the second lithium-metal oxide are applied in combination to a secondary battery, a swelling phenomenon which is a problem of the positive electrode active material having a high nickel content and the electrolyte and problems such as deteriorated high-temperature stability and lowered capacity may be overcome.

A preferred combination with the electrolyte including the difluorophosphite compound, in particular, the electrolyte including the difluorophosphite compound and vinyl carbonate, fluoroethyl carbonate, 1,3-propanesultone (PS), lithium difluoro bis(oxalato)phosphate (LiDFBOP), and ethylene sulfate (ESA) as an additional additive included in the lithium secondary battery according to an exemplary embodiment of the present invention is that in which the first lithium-metal oxide included in the positive electrode active material is $Li_x(Ni_aCo_bMn_c)O_2$ having a core-shell structure in which one or more metals other than lithium has a concentration gradient region in the shell part wherein $0.90 \leq x \leq 1.10$, $0.3 \leq a \leq 0.9$, $0.05 \leq b < 0.5$, $0.05 \leq c < 0.5$, and $a+b+c=1$, more preferably $Li_{1.0}Ni_{0.8}Co_{0.1}Mn_{0.1}O_2$ having the core-shell structure, and the second lithium-metal oxide is $i_x(Ni_aCo_bMn_c)O_2$ wherein $0.90 \leq x \leq 1.10$, $0.3 \leq a \leq 0.9$, $0.05 \leq b < 0.5$, $0.05 \leq c < 0.5$, and $a+b+c=1$, more preferably $Li_{1.0}Ni_{0.8}Co_{0.1}Mn_{0.1}O_2$.

Preferably, in the positive electrode active material according to an exemplary embodiment, the core-shell structure and the lithium-metal oxide may be $LiNi_{0.6}Co_{0.2}Mn_{0.2}O_2$, $LiNi_{0.5}Co_{0.2}Mn_{0.3}O_2$, $LiNi_{0.8}Co_{0.1}Mn_{0.1}O_2$, $LiNi_{1/3}Co_{1/3}Mn_{1/3}O_2$, or a mixture thereof, more preferably, $LiNi_{0.8}Co_{0.1}Mn_{0.1}O_2$, $LiNi_{0.5}Co_{0.2}Mn_{0.3}O_2$, or a mixture thereof, and still more preferably, $LiNi_{0.8}Co_{0.1}Mn_{0.1}O_2$.

The lithium secondary battery which adopts the positive electrode manufactured with the positive electrode active material including a mixture of the first lithium-metal oxide of $Li_{1.0}Ni_{0.8}Co_{0.1}Mn_{0.1}O_2$ having a core-shell structure in which one or more metals other than lithium has a concentration gradient region in the shell part and the second lithium-metal oxide of $Li_{1.0}Ni_{0.8}Co_{0.1}Mn_{0.1}O_2$, which is a preferred combination with the electrolyte including the difluorophosphite compound according to an exemplary embodiment of the present invention, and vinyl carbonate, fluoroethylene carbonate, 1,3-propanesultone (PS), lithium difluorobis(oxalato)phosphate (LiDFBOP), and ethylene sulfate (ESA) as the additional additive, has surprisingly improved high-temperature storage stability and life characteristics particularly under a high voltage.

The negative electrode of the lithium secondary battery according to an exemplary embodiment of the present invention includes a negative electrode current collector and a negative electrode active material layer formed on the negative electrode current collector, the negative electrode active material layer includes a negative electrode active material which may adsorb and desorb lithium ions, and as the negative electrode active material, carbon materials such as crystalline carbon, amorphous carbon, a carbon composite, and carbon fiber, a lithium metal, an alloy of lithium and another element, and the like may be used. Non-limiting examples of the amorphous carbon include soft carbon (low temperature baked carbon), hard carbon, coke, mesocarbon microbeads (MCMB) baked at 1500° C. or lower, mesophase pitch-based carbon fiber (MPCF), or the like. Non-limiting examples of the crystalline carbon include graphite-based materials, and specifically natural graphite, graphitized coke, graphitized MCMB, graphitized MPCF, or the like. The carbon materials are preferably a material having an interplanar distance of 3.35 to 3.38 Å, and Lc (crystallite size) by X-ray diffraction of at least 20 nm or more. As other elements forming an alloy with lithium, aluminum, zinc, bismuth, cadmium, antimony, silicon, lead, tin, gallium, or indium may be used.

The positive electrode or the negative electrode may be manufactured by dispersing an electrode active material of each electrode, a binder, a conductive material, and if necessary, a thickener in a solvent to prepare an electrode slurry composition, and applying the slurry composition on an electrode current collector. As the positive electrode current collector, aluminum, an aluminum alloy, or the like may be often used, and as a negative electrode current collector, copper, a copper alloy, or the like may be often used. The positive electrode current collector and the negative electrode current collector may be in the form of foil or mesh.

The binder is a material serving as pasting of the active material, mutual adhesion of the active material, adhesion with the current collector, a buffer effect to expansion and shrinkage of the active material, and the like, and includes for example, polyvinylidene fluoride (PVdF), a copolymer of polyhexafluoropropylene-polyvinylidene fluoride (PVdF/HFP), poly(vinyl acetate), polyvinyl alcohol, polyethylene oxide, polyvinyl pyrrolidone, alkylated polyethylene oxide, polyvinyl ether, poly(methyl methacrylate), poly(ethyl acrylate), polytetrafluoroethylene, polyvinyl chloride, polyacrylonitrile, polyvinyl pyridine, a styrene-butadiene rubber, an acrylonitrile-butadiene rubber, and the like. The content of the binder is 0.1 to 30 wt %, and preferably 1 to 10 wt %, based on the electrode active material. When the content of the binder is too low, the adhesion strength between the electrode active material and the current collector will be insufficient, and when the content of the binder is too high, the adhesion strength will be better, but the content of the electrode active material will be reduced by the increased amount of the binder, and thus, it is disadvantageous to increase a battery capacity.

The conductive material which is used for imparting conductivity to an electrode, may be any material as long as it does not cause any chemical change and is an electron conductive material in a composed battery, and at least one selected from the group consisting of graphite-based conductive materials, carbon black-based conductive materials, metals, or metal compound-based conductive materials may be used as the conductive material. Examples of the graphite-based conductive material include artificial graphite, natural graphite, or the like, examples of the carbon black-based conductive material include acetylene black, ketjen black, denka black, thermal black, channel black, or the like, and examples of the metal-based or metal compound-based conductive material include a perovskite material such as tin, tin oxide, tin phosphate ($SnPO_4$), titanium oxide, potassium titanate, $LaSrCoO_3$ or $LaSrMnO_3$. However, the conductive material is not limited thereto.

The content of the conductive material is preferably 0.1 to 10 wt %, based on the electrode active material. When the content of the conductive material is lower than 0.1 wt %, an electrochemical property is deteriorated, and when the content is higher than 10 wt %, energy density per weight is decreased.

The thickener is not particularly limited as long as it may serve to control the viscosity of an active material slurry, and for example, carboxymethyl cellulose, hydroxylmethyl cellulose, hydroxylethyl cellulose, hydroxypropyl cellulose, or the like may be used.

As the solvent in which the electrode active material, the binder, the conductive material, and the like are dispersed, a nonaqueous solvent or an aqueous solvent is used. The nonaqueous solvent may include N-methyl-2-pyrrolidone (NMP), dimethyl formamide, dimethyl acetamide, N,N-dimethylaminopropylamine, ethylene oxide, tetrahydrofuran, and the like.

The lithium secondary battery according to an exemplary embodiment of the present invention may include a separator which prevents a short circuit between the positive electrode and the negative electrode and provides a moving channel of lithium ions, and as the separator, a polyolefin-based polymer film such as polypropylene, polyethylene, polyethylene/polypropylene, polyethylene/polypropylene/polyethylene, and polypropylene/polyethylene/polypropylene, or a multiple film thereof, a microporous film, and woven and non-woven fabric may be used. Further, a film where a resin having excellent stability is coated on a porous polyolefin film may be used.

The lithium secondary battery of the present invention may be formed in another shape such as a cylindrical or pouch shape in addition to a square shape. The secondary battery is also appropriate for uses requiring high voltage, high output, and high-temperature drive, such as an electric vehicle, in addition to the conventional uses as a mobile phone, a portable computer, or the like. In addition, the secondary battery may be combined with conventional internal combustion engines, fuel cells, supercapacitors, and the like to be used in a hybrid vehicle and the like also, and may be used in electric bicycles, machine tools, and other any uses requiring high output, high voltage, and high-temperature drive.

Hereinafter, the Examples and Comparative Examples of the present invention will be described. However, the following Examples are only a preferred exemplary embodiment of the present invention, and the present invention is not limited thereto. Assuming that a lithium salt is all dissociated in order that a lithium ion concentration becomes 1 mol (1 M), a basic electrolyte may be formed by dissolving a corresponding amount of the lithium salt such as $LiPF_6$ in a basic solvent so that the concentration becomes 1 mol (1 M).

[Example 1] Preparation of pentyldifluorphosphite ($CH_3(CH_2)_4OPF_2$, hereinafter, referred to as "PDFP")

Step 1: Preparation of pentyldichlorophosphite ($CH_3(CH_2)_4OPCl_2$)

Tetrahydrofuran (200 mL) was added to a 500 mL flask. Trichlorophosphine ($PCl_3$) (56 mL, 0.57 mol) was added, stirring was performed for 10 minutes, and the temperature was lowered to a low-temperature state near 0° C. using ice water. 1-Pentanol (50 g, 0.57 mol) was slowly added dropwise thereto for 30 minutes, and the solution was stirred for 3 hours while the temperature was raised to room temperature. The reaction mixture was depressurized to vacuum to remove a volatile material. A nuclear magnetic resonance device was used to perform analysis to confirm residual materials and a final product. The final product after depressruization, pentyldichlorophosphate (75 g, 0.40 mol) was obtained in a yield of 70% with a purity of almost 100%.

$^1H$ NMR (500 MHz, $C_6D_6$) δ 0.94 (m, 3H), 1.00-1.40 (m, 6H), 3.80 (m, 2H) ppm.

Step 2: Preparation of pentyldifluorphosphite ($CH_3(CH_2)_4OPF_2$)

Antimony trifluoride ($SbF_3$) (20 g, 0.11 mol) was added to a 100 mL flask under a nitrogen atmosphere. In order to prevent heating, synthetic product damage, and a lowered yield of the final product by a rapid reaction, the temperature was lowered to a low-temperature state near 0° C. Pentyldichlorophosphite (30 g, 0.16 mol) prepared in Step 1 above was slowly added dropwise. As the reaction proceeds, the solution changed to a brown or dark brown liquid. After the reaction sufficiently proceeds at room temperature for 12 hours or more, the solution was heated and subjected to vacuum distillation for purification. That is, when an external heating temperature was near 130° C., pentyldifluorophosphate (12 g, 0.077 mol) in which a transparent liquid began to distill was obtained as a final product in a yield of 48%.

$^1H$ NMR (500 MHz, $C_6D_6$) δ 0.74 (m, 3H), 1.00-1.20 (m, 4H), 1.30 (m, 2H), 3.67 (q, 2H) ppm; $^{31}P$ NMR (500 MHz, $C_6D_6$) δ 110 ppm (t, 2P); $^{19}F$ NMR (500 MHz, $C_6D_6$) δ −46 (s, F), −50 ppm (s, F).

[Example 2] Preparation of (1,3-bis(allyloxy)propan-2-yl)difluorophosphite

Step 1: Preparation of (1,3-bis(allyloxy)propane-2-yl)dichlorophosphite ($C_9H_{15}C_{12}O_3P$)

150 ml of acetonitrile was added to a 500 ml flask under a nitrogen atmosphere, 37.78 g (275.5 mmol) of trichlorophosphine ($PCl_3$) was added thereto, and the temperature was lowered to −15° C. using brine and dry ice. A mixed solution of 43.56 g (252.9 mmol) of 1,3-bis(allyloxy)propane-2-ol and 20 ml of acetonitrile was slowly added dropwise thereto for 1 hour, and the solution was stirred for 3 hours while the temperature was raised to room temperature. The reaction mixture was depressurized to vacuum to remove the solvent, thereby obtaining 58.85 g (215.5 mmol) of (1,3-bis(allyloxy)propane-2-yl)dichlorophosphite ($C_9H_{15}C_{12}O_3P$) as the final product in a yield of 85.2%.

$^1H$ NMR (500 MHz, $C_6D_6$) δ 5.70 (m, 2H), 5.13 (d, 2H), 4.99 (d, 2H), 4.77 (m, 1H), 3.68 (m, 4H), 3.45 (m, 4H) ppm Step 2: Preparation of (1,3-bis(allyloxy)propane-2-yl)difluorophosphite ($C_9H_{15}F_2O_3P$)

17.00 g (95.4 mmol) of antimony trifluoride was added to a 100 ml flask under a nitrogen atmosphere. In order to prevent heating, synthetic product damage, and a lowered yield of the final product by a rapid reaction, the temperature was lowered to 0° C. 38.76 g (141.9 mol) of (1,3-bis(allyloxy)propan-2-yl)dichlorophosphite obtained in Step 1 was slowly added dropwise for 1 hour, and then the solution was further stirred for 2 hours while the temperature was raised to room temperature. Distillation under reduced pressure was performed for purification to obtain 23.6 g (98.3 mmol) of (1,3-bis(allyloxy)propane-2-yl)difluorophosphate ($C_9H_{15}F_2O_3P$) as a final product in a yield of 69.2%.

$^1H$ NMR (500 MHz, $C_6D_6$) δ 5.69 (m, 2H), 5.13 (d, 2H), 4.99 (d, 2H), 4.51 (m, 1H), 3.67 (m, 4H), 3.28 (m, 4H) ppm The difluorophosphite compound according to an exemplary embodiment of the present invention may be prepared by the methods known in PCT/KR2019/001682 and Korean Patent Application No. 2018-0155136, and the difluorophosphite compounds known in these documents are all included in the present invention.

Examples 3 to 6

An electrolyte was prepared by further adding the components described in following Table 1, using a solution in which $LiPF_6$ is dissolved in a mixed solvent of ethylene carbonate (EC) and ethylmethyl carbonate (EMC) at a volume ratio of 25:75 so that the solution becomes a 1.0 M solution, as a basic electrolyte (1.0 M $LiPF_6$, EC/EMC=25:75).

The first lithium-metal oxide having a structure including secondary particles formed by aggregating primary particles without a concentration gradient (NCM-811) or a core-shell structure (CSG-811), included in the positive electrode active material, $LiNi_{0.8}Co_{0.1}Mn_{0.1}O_2$ was prepared in the form of a first lithium-metal oxide precursor, as follows.

An aqueous metal solution for preparing $LiNi_{0.8}Co_{0.1}Mn_{0.1}O_2$ having a structure including secondary particles formed by aggregating primary particles without a concentration gradient or a core-shell structure was prepared, and supplied to a coprecipitation reactor. Before the aqueous metal solution was added to the coprecipitation reactor, distilled water was added thereto and a nitrogen gas was supplied to the reactor, thereby removing dissolved oxygen, and the temperature of the reactor was heated to 60 to 80° C. and then stirring at 500 rpm was performed. Thereafter, the aqueous metal solution was added to the coprecipitation reactor at 0.3 L/hr, and an ammonia solution was continuously added thereto at 0.03 L/hr. An aqueous NaOH solution was supplied for pH adjustment, so that the pH in the reactor was maintained at 10.5 to 11, and a coprecipitation reaction was performed at an impeller speed of the coprecipitation reactor of 500 rpm to obtain a precipitate. A residence time in the coprecipitation reactor was adjusted to control the density of a coprecipitated compound, and in the present example, a flow rate was adjusted so that the residence time is 5 hours or more for a process cost and an appropriate density of the coprecipitated compound. The coprecipitated compound obtained by the precipitate was filtered, and the thus-obtained coprecipitated compound was a coprecipitated compound having a structure having no concentration gradient, and for obtaining a coprecipitated compound having a core-shell structure, water was further mixed with the coprecipitate, the mixture was heated up to 60 to 80° C., a sulfuric acid solution (0.05 M-2 M) was added, stirring was performed, and wet leaching of nickel present on a surface part of the coprecipitated compound was performed, thereby obtaining a metal oxide precursor ($Ni_{0.8}Co_{0.1}Mn_{0.1}(OH)_2$) having a core-shell structure. Each of the thus-obtained precursors was mixed with lithium hydroxide, and the mixture was placed in an alumina crucible and baked at 700 to 750° C. for 15 hours under an oxygen gas flow of 5 L/min (heating rate of 3° C./min), thereby preparing each of the first lithium-metal oxide having a structure having no concentration gradient and the first lithium-metal oxide having a core-shell structure. Specifically, a lithium-metal oxide in the form of secondary particles in which the first lithium-metal oxide having a core-shell structure was $LiNi_{0.80}Co_{0.11}Mn_{0.09}O_2$, the composition of a core part was $LiNi_{0.802}Co_{0.11}Mn_{0.088}O_2$, the average composition of a shell part was $LiNi_{0.77}Co_{0.11}Mn_{0.12}O_2$, and a concentration gradient layer was formed in the shell part section to have a concentration gradient of nickel and manganese, was obtained.

A D50 value was between 11 and 16 um, and an initial discharge capacity of the positive electrode adopting the first lithium-metal oxide as an active material was 195 mAh/g or more.

Figure 1:
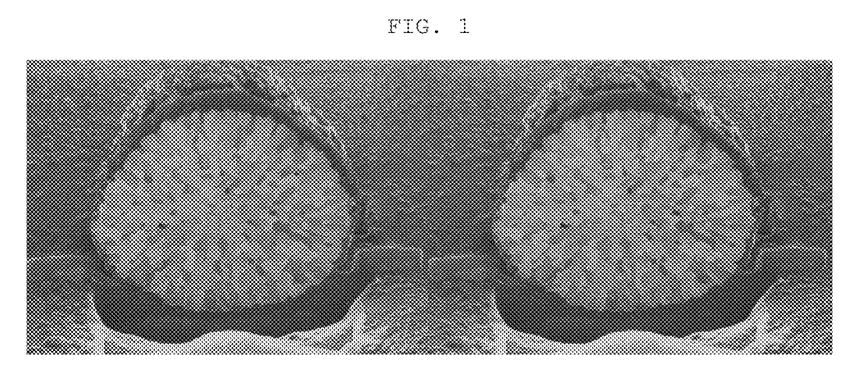
FIG. 1 is an SEM photograph of a first lithium-metal oxide prepared in Example 1 of the present invention (CSG-811 (left) and NCM-811 (right)).

The thus-prepared first lithium-metal oxide is shown in FIG. 1, and it was found from FIG. 1 that the first lithium-metal oxide having a core-shell structure was prepared.

The second lithium-metal oxide, $LiNi_{0.8}Co_{0.1}Mn_{0.1}O_2$, included in the positive electrode active material was prepared in the form of the second lithium-metal oxide precursor as shown below.

Figure 2:
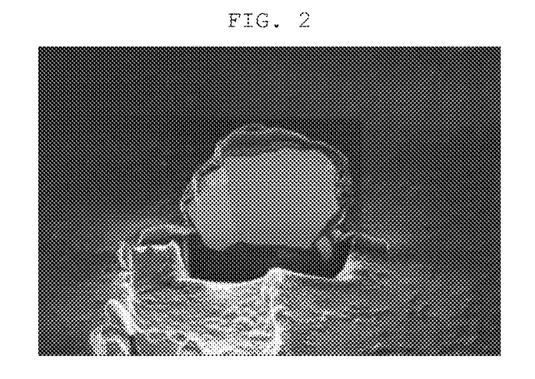
FIG. 2 is an SEM photograph of a second lithium-metal oxide prepared in Example 1 of the present invention.

$Li_2CO_3$, $Ni(OH)_2$, $Mn_3O_4$, and $Co(OH)_2$ were used as staring raw materials of the present experiment and weighed to be a stoichiometric ratio of $LiNi_{0.8}Co_{0.1}Mn_{0.1}O_2$, and pure water was added so that a solid/liquid ratio was 5:5. The raw materials were stirred in a stirrer at 400 rpm for 10 minutes so that the materials were uniformly mixed, and pulverized and dispersed at a high speed in a wet pulverization device to be slurried. Zirconia beads having a diameter of 0.65 mm were used during wet pulverization and dispersion, and a pulverization time was fixed to 30 minutes. Pulverization and dispersion were performed until a particle size (D50) of particles in the pulverized slurry was 0.3 µm, and the viscosity of the slurry was adjusted to 500 cp or less at this time. Drying and molding of the slurry were performed using a spray drying device, and an input hot air temperature was 250 to 300° C. and an exhaust hot air temperature was 100 to 150° C. After the prepared precursor powder was mixed with lithium hydroxide, each mixture was added to an alumina crucible and baked at 800 to 850° C. for 15 hours (heating rate of 3° C./min) under an oxygen gas flow of 5 L/min, thereby preparing the second lithium-metal oxide. The thus-prepared second lithium-metal oxide is shown in FIG. 2, and it was found from FIG. 2 that the second lithium-metal oxide was prepared.

A D50 value was between 2 and 6 um, and an initial discharge capacity of the positive electrode adopting the second lithium-metal oxide as the positive electrode active material was 195 mAh/g or more.

A battery to which the nonaqueous electrolyte and the positive electrode active material was applied was manufactured as follows:

A mixing ratio of the lithium-metal oxide and the second lithium-metal oxide was changed from 90 wt %:10 wt % to 60 wt %:40 wt % by 10 wt %, Denka Black was used as a conductive agent, PVDF was used as a binder, a positive electrode slurry having each weight ratio composition of the entire active material, the conductive agent, and the binder of 97:2:1 was prepared, and then coated, dried, and pressed on an aluminum substrate to manufacture a positive electrode. Here, the density of the positive electrode after pressing was >3.7 g/cc, and the current density was >3.6 mA/cm².

A negative electrode slurry including 93 wt % of natural graphite, 5 wt % of KS6 which is a flake type conductive material as a conductive material, 1 wt % of a styrene-butadiene rubber (SBR) as a binder, and 1 wt % of carboxymethyl cellulose (CMC) as a thickener was coated, dried, and pressed on a copper substrate to manufacture a negative electrode.

The positive electrode and the negative electrode were notched to an appropriate size, respectively and laminated, a separator (polyethylene, a thickness of 25 µm) was interposed between the positive electrode and the negative electrode to form a cell, and a tab part of the positive electrode and the tab part of the negative electrode were welded, respectively. An assembly of the welded positive electrode/separator/negative electrode was placed in a pouch, and three sides except an electrolyte injection part side were sealed. Here, a portion where a tabs exists was included in a sealing region. The electrolyte was injected to the remaining side portion, the remaining one side was sealed, and impregnation was performed for 12 hours.

Thereafter, pre-charging to a current (5 Å) corresponding to 0.25 C was performed for 36 minutes. After 1 hour, degassing was performed, aging was performed for 24 hours, and then formation charging and discharging were performed (charge condition: CC-CV 0.2 C 4.2 V 0.05 C CUT-OFF, discharge condition: CC 0.2 C 2.5 V CUT-OFF). Thereafter, standard charging and discharging were performed (charge condition: CC-CV 0.5 C 4.2 V 0.05 C CUT-OFF, discharge condition: CC 0.5 C 2.5 V CUT-OFF).

Comparative Examples 1 and 7

The process was performed in the same manner as in Examples 3 to 6, except that the lithium-metal oxide and the electrolyte additive included in the positive electrode active material shown in the following Table 1 were changed, evaluation was performed, and the results are shown in Table 1.

Performance of the thus-manufactured battery was evaluated as follows, and the results are shown in Table 1.

Evaluation items were as follows:

*Evaluation Items*

1. Life Characteristics at 45° C.

Cells manufactured in Examples 3 to 6 and Comparative Examples 1 to 7 were charged (CC-CV 1.0 C 4.2 V 0.05 C CUT-OFF) and discharged (CC 1.0 C 2.7 V CUT-OFF) repeatedly 300 times in a chamber at 45° C., and then a 300th discharge capacity was calculated as % relative to a 1st discharge capacity and a capacity retention rate was calculated.

2. Storage Characteristics at 60° C.

Batteries manufactured in Examples 3 to 6 and Comparative Examples 1 to 7 were charged, stored in a thermostatic chamber at 60° C. for 4 weeks, and then a gassing amount was measured by GC analysis.

TABLE 1

| Classification | First lithium-metal oxide | | | | Second lithium-metal oxide | | | | Life at 45° C. for 300 cycles Capacity retention rate(%) | Storage at 60° C. for 4 weeks Gassing amount (ml) |
| --- | --- | --- | --- | --- | --- | --- | --- | --- | --- | --- |
| | Type | Secondary particle diameter (μm) | Primary particle diameter (μm) | Weight (wt %) | Type | Primary particle diameter (μm) | Weight (wt %) | Electrolyte composition | | |
| Example 3 | CSG-811 | 12.75 | 0.84 | 90 | SC-811 | 3.72 | 10 | Basic Electrolyte + PDFP | 89.3 | 23 |
| Example 4 | NCM-811 | 12.81 | 1.21 | 80 | SC-811 | 2.43 | 20 | Basic Electrolyte + PDFP | 93.1 | 14 |
| Example 5 | CSG-811 | 12.75 | 0.88 | 70 | SC-811 | 2.98 | 30 | Basic Electrolyte + PDFP | 92.7 | 15 |
| Example 6 | NCM-811 | 12.75 | 1.51 | 60 | SC-811 | 3.31 | 40 | Basic Electrolyte + PDFP | 92.2 | 17 |
| Comparative Example 1 | CSG-811 | 12.78 | 0.79 | 100 | SC-811 | 2.87 | 0 | Basic electrolyte | 82.1 | 45 |
| Comparative Example 2 | NCM-811 | 12.8 | 0.97 | 90 | SC-811 | 3.14 | 10 | Basic electrolyte | 84.4 | 42 |
| Comparative Example 3 | CSG-811 | 12.74 | 0.87 | 80 | SC-811 | 3.42 | 20 | Basic electrolyte | 87.3 | 31 |
| Comparative Example 4 | NCM-811 | 12.74 | 1.25 | 70 | SC-811 | 2.89 | 30 | Basic electrolyte | 86.1 | 33 |
| Comparative Example 5 | CSG-811 | 12.69 | 0.62 | 60 | SC-811 | 3.76 | 40 | Basic electrolyte | 86.5 | 37 |
| Comparative Example 6 | CSG-811 | 12.71 | 0.78 | 100 | SC-811 | 3.36 | 0 | Basic Electrolyte + PDFP | 85.6 | 35 |

TABLE 1-continued

| Classification | First lithium-metal oxide | | | | Second lithium-metal oxide | | | | Life at 45° C. for 300 cycles Capacity retention rate(%) | Storage at 60° C. for 4 weeks Gassing amount (ml) |
|---|---|---|---|---|---|---|---|---|---|---|
| | Type | Secondary particle diameter (μm) | Primary particle diameter (μm) | Weight (wt %) | Type | Primary particle diameter (μm) | Weight (wt %) | Electrolyte composition | | |
| Comparative Example 7 | CSG-811 | 12.73 | 1.07 | 80 | SC-811 | 1.19 | 20 | Basic Electrolyte + PDFP | 86.3 | 34 |

PDFP: 1 wt % of compound prepared in Example 1
CSG-811: $Li_{1.0}Ni_{0.8}Co_{0.1}Mn_{0.1}O_2$ having a core-shell structure
NCM-811: $Li_{1.0}Ni_{0.8}Co_{0.1}Mn_{0.1}O_2$ having a structure having no concentration gradient
SC-811: second lithium-metal oxide, $Li_{1.0}Ni_{0.8}Co_{0.1}Mn_{0.1}O_2$ Basic electrolyte: 0.5 wt % of vinylene carbonate (VC), 1 wt % of fluoroethylcarbonate (FEC), 1 wt % of lithium bis(oxalato)phosphate, 0.5 wt % of 1,3-propenesultone (PRS), 1 wt % of 1,3-propanesultone (PS), and 0.5 wt % of ethylene sulfate (ESA).

It was confirmed from the above Table 1 that the lithium secondary batteries of Examples 3 to 6 of the present invention which adopted the positive electrode adopting the positive electrode active material prepared by mixing the first lithium-metal oxide and the second metal oxide and the electrolyte including the difluorophosphite compound as the additive had improved high-temperature storage characteristics as compared with the lithium secondary battery of Comparative Example 1 which adopted the positive electrode manufactured with an active material including only the first lithium-metal oxide and the electrolyte adopting no difluorophosphite compound, the lithium secondary batteries of Comparative Examples 2 to 5 which adopted an electrolyte including no additive of the present invention, the lithium secondary battery of Comparative Example 6 which adopted a positive electrode manufactured with an active material including only the first lithium-metal oxide, and the lithium secondary battery of Comparative Example 7 which adopted a positive electrode including primary particles having a small average particle diameter, thereby having a significantly decreased gassing amount after high-temperature storage and surprisingly improved high-temperature storage stability.

In particular, it was confirmed that the lithium secondary battery which adopted the positive electrode manufactured with the positive electrode active material in which the first lithium-metal oxide and the second lithium-metal oxide were mixed at a mixing ratio of 8:2 and the electrolyte including the difluorophosphite compound as the additive had significantly improved high-temperature capacity retention rate and high-temperature storage stability.

The second lithium-metal oxide including particles of 2 μm or more used in the lithium secondary battery of the present invention may be advantageous for suppressing gas generation due to the large primary particles, but disadvantageous for life due to crack occurrence between the primary particles due to repeated charging and discharging, and thus, by including the difluorophosphite compound in the electrolyte, when cracks occur between the primary particles of the second lithium-metal oxide, the difluorophosphite compound protects a crack surface to suppress further gassing, whereby the lithium secondary battery of the present invention has output which is not lowered even under high voltage, excellent life characteristics, and also particularly surprisingly improved high-temperature characteristics.

Therefore, the lithium secondary battery of the present invention has excellent high-temperature storage stability as well as an excellent capacity recovery rate at a high temperature, and improved life characteristics at a high temperature, by adopting a combination of a positive electrode employing a positive electrode active material using a mixture of two lithium-metal oxides having a specific structure and an electrolyte containing a difluorophosphite compound as a specific additive.

In addition, the lithium secondary battery of the present invention has a small amount of gassing even after long-term storage at a high temperature, and thus, much improved high-temperature stability, by adopting a combination of the electrolyte including the difluorophosphite compound and two positive electrode active material components having a specific structure.

In addition, the lithium secondary battery of the present invention has decreased battery internal resistance to have further improved output characteristics, by adopting the difluorophosphite compound in the electrolyte.

Furthermore, the lithium secondary battery of the present invention may have improved cycle characteristics and stability even at a high temperature and during charging and discharging under high voltage, by adopting the electrolyte containing the difluorophosphite compound which may suppress an electrolyte side reaction at high temperature in a high voltage environment and the positive electrode manufactured with the positive electrode active material including a mixture of the lithium-metal oxides having a specific structure.

What is claimed is:
1. A lithium secondary battery comprising:
   a positive electrode comprising a first lithium-metal oxide comprising secondary particles formed by aggregating primary particles having a particle diameter of less than 2 μm, and a second lithium-metal oxide comprising nickel and at least one or more metals and comprising primary particles having a particle diameter of 2 μm or more, wherein the at least one or more metals comprises manganese, cobalt, or both;
   a negative electrode;
   a separator interposed between the positive electrode and the negative electrode; and
   an electrolyte comprising a lithium salt, a nonaqueous organic solvent, and a compound containing at least one difluorophosphite group and at least one or more olefin groups, wherein the compound containing at least one difluorophosphite group and at least one or more olefin groups is represented by the following Chemical Formula 4 or Chemical Formula 5:

[Chemical Formula 4]

wherein
$R_1$ to $R_3$ are independently of one another hydrogen, *—$(CH_2)_r$—$OPF_2$, C1-C10 alkyl, or C2-C10 alkenyl;
L is C1-C10 alkylene, and the alkylene of L may be further substituted by one or more selected from the group consisting of C1-C10 alkyl, *—$(CH_2)_a$—$OPF_2$, and R' is hydrogen or —$OPF_2$;
a and b are independently of each other an integer of 0 to 5;
q is an integer of 0 to 5; and
r is an integer of 0 to 5,

[Chemical Formula 5]

wherein
ring D is mono-, bi-, or tri-C6-C20 cycloalkenyl,
wherein the compound containing at least one difluorophosphite group and at least one or more olefin groups is comprised at 0.1 to 5 wt %, based on a total weight of the electrolyte.

2. The lithium secondary battery of claim 1, wherein the first lithium-metal oxide comprises secondary particles formed by aggregating primary particles having a particle diameter of 0.62 um or more and less than 2 μm, the second lithium-metal oxide comprises primary particles having a particle diameter of 2 μm or more and 8 μm or less.

3. The lithium secondary battery of claim 1, wherein the first lithium-metal oxide has a core-shell structure comprising a core part and a shell part having a concentration gradient region in which one or more metals other than lithium has a concentration gradient, and is represented by the following Chemical Formula 11, and in the following Chemical Formula 11, at least one of M1, M2, and M3 has a concentration gradient in the concentration gradient region:

$Li_x(M1)_a(M2)_b(M3)_cO_y$ [Chemical Formula 11]

wherein
M1, M2, and M3 are independently of one another selected from the group consisting of Ni, Co, Mn, Na, Mg, Ca, Ti, V, Cr, Cu, Zn, Ge, Sr, Ag, Ba, Zr, Nb, Mo, Al, Ga, and B; and $0<x≤1.1$, $2y≤2.02$, $0≤a≤1$, $0≤b≤1$, $0<c<1$, and $0<a+b+c≤1$ are satisfied.

4. The lithium secondary battery of claim 3, wherein the shell part has a thickness range of 0.1 to 2 μm from a first lithium-metal oxide surface to the core part which is in a center side.

5. The lithium secondary battery of claim 3, wherein M1 is Ni, and $0.6≤a≤0.95$ and $0.05≤b+c≤0.4$ are satisfied.

6. The lithium secondary battery of claim 1, wherein the second lithium-metal oxide is represented by the following Chemical Formula 12:

$Li_xNi_aCO_bMn_c(M4)_d(M5)_eO_y$ [Chemical Formula 12]

wherein
M4 comprises one or more elements selected from the group consisting of Ti, Zr, Al, Mg, and Cr;
M5 comprises any one or two or more elements selected from the group consisting of Sr, Y, W, and Mo; and
$0<x<1.5$, $2≤y≤2.02$, $0<a<1$, $0<b<1$, $0<c<1$, $0≤d≤0.03$, $0≤e≤0.030$, and $0<a+b+c≤1$ are satisfied.

7. The lithium secondary battery of claim 6, wherein in Chemical Formula 12, d and e are 0, and $0.5≤a<1$, $0.01≤b≤0.3$, and $0.01≤c<1$ are satisfied.

8. The lithium secondary battery of claim 1, wherein a content of the first lithium-metal oxide is higher than a content of the second lithium-metal oxide in the positive electrode.

9. The lithium secondary battery of claim 1, wherein the compound containing at least one difluorophosphite group and at least one or more olefin groups is any one or more selected from a compound represented by the following Chemical Formula 21, a compound represented by the following Chemical Formula 22, a compound represented by the following Chemical Formula 23, a compound represented by the following Chemical Formula 24, a compound represented by the following Chemical Formula 25, a compound represented by the following Chemical Formula 26, a compound represented by the following Chemical Formula 27, a compound represented by the following Chemical Formula 28, a compound represented by the following Chemical Formula 29, a compound represented by the following Chemical Formula 30, a compound represented by the following Chemical Formula 31, a compound represented by the following Chemical Formula 32, and a compound represented by the following Chemical Formula 33.

[Chemical Formula 21]

[Chemical Formula 22]

[Chemical Formula 23]

[Chemical Formula 24]

[Chemical Formula 25]

[Chemical Formula 26]

[Chemical Formula 27]

[Chemical Formula 28]

[Chemical Formula 29]

[Chemical Formula 30]

[Chemical Formula 31]

[Chemical Formula 32]

[Chemical Formula 33]

10. The lithium secondary battery of claim 1, wherein the electrolyte further comprises one or two or more additional additives selected from the group consisting of oxalatoborate-based compounds, oxalatophosphate-based additives, fluorine-substituted carbonate-based compounds, vinylidene carbonate-based compounds and sulfinyl group-containing compounds, wherein the additional additive is comprised at 0.1 to 10.0 wt %, based on the total weight of the electrolyte.

11. The lithium secondary battery of claim 10, wherein the one or two or more additional additives include fluoroethylene carbonate, difluoroethylene carbonate, fluorodimethyl carbonate, fluoroethylmethyl carbonate, vinylene carbonate, vinylethylene carbonate, lithium bis (oxalato) borate (LiBOB), lithium difluorobis (oxalato) phosphate (LiDFBOP), ethanesultone, 1,3-propanesultone, 1,4-butanesultone, ethenesultone, 1,3-propenesultone, 3-fluoro-1,3-propanesultone, 1,4-butenesultone, ethylene sulfate, propylene sulfate, 2,3-butylene sulfate, 1,3-propylene sulfate, or 1,3-butylene sulfate.

* * * * *